US006689836B2

(12) United States Patent
Vaidya et al.

(10) Patent No.: US 6,689,836 B2
(45) Date of Patent: Feb. 10, 2004

(54) PROCESS FOR THE PREPARATION OF THERMOPRECIPITATING AFFINITY POLYMERS

(75) Inventors: Alankar Arun Vaidya, Maharashtra (IN); Bhalchandra Shripad Lele, Maharashtra (IN); Mohan Gopalkrishna Kulkarni, Maharashtra (IN); Raghunath Anant Mashelkar, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/096,419

(22) Filed: Mar. 11, 2002

(65) Prior Publication Data

US 2002/0143129 A1 Oct. 3, 2002

Related U.S. Application Data

(63) Continuation of application No. 09/518,876, filed on Mar. 6, 2000, now Pat. No. 6,420,487.

(30) Foreign Application Priority Data

Sep. 8, 1999 (IN) .................................... 1200/DEL/99

(51) Int. Cl.[7] .................. C08L 89/00; C08F 283/00; C12N 11/08
(52) U.S. Cl. ............... 525/54.1; 525/54.11; 521/149; 521/187; 435/180; 435/181; 435/188; 435/213
(58) Field of Search ................ 525/326.5, 327.5, 525/327.6, 54.11, 54.1; 526/303.1, 307.2, 307.4, 307.6; 521/149, 187; 435/180, 181, 188, 213

(56) References Cited

U.S. PATENT DOCUMENTS

| | | | | |
|---|---|---|---|---|
| 4,171,412 A | * | 10/1979 | Coupek et al. | 525/54.11 |
| 5,064,817 A | * | 11/1991 | Yedgar et al. | 514/78 |
| 5,162,307 A | * | 11/1992 | Digenis et al. | 514/19 |
| 6,309,644 B1 | * | 10/2001 | Chandrashekar et al. | 424/191.1 |
| 6,420,487 B1 | * | 7/2002 | Vaidya et al. | 525/326.9 |

OTHER PUBLICATIONS

H. Tani et al "Extraction of Protein Based on Phase Separation in Aqueous Triblock Copolymer Surfactant Solutions" Analytica Sciences, Dec. 1997, vol. 13, pp. 925–929.*

* cited by examiner

Primary Examiner—Tatyana Zalukaeva
(74) Attorney, Agent, or Firm—Darby & Darby

(57) ABSTRACT

The present invention relates to a process for the preparation of thermoprecipitating affinity polymers useful in the enhanced recovery of enzymes. The process comprises polymerising a monomer comprising a spacer and a co-monomer with a polymerisation initiator and a polymerisation accelerator at ambient temperature and pressure for a period ranging between 2 to 24 hours to obtain a polymer and then linking an inhibitor to pendant carboxyl groups of the spacers in the polymer to obtain an affinity polymer.

2 Claims, No Drawings

PROCESS FOR THE PREPARATION OF THERMOPRECIPITATING AFFINITY POLYMERS

This is a continuation, of application Ser. No. 09/518,876, filed Mar. 6, 2000 now U.S. Pat. No. 6,420,487. Each of these prior applications is hereby incorporated herein by reference, in its entirety.

FIELD OF THE INVENTION

The present invention relates to a process for the preparation of thermoprecipitating affinity polymers. More particularly, the present invention relates to a process for the preparation of polymers useful for the separation of enzymes of protease type exemplified by trypsin. Affinity polymers prepared by the process of the present invention exhibit stronger binding with trypsin which is useful in enhancing the recovery of trypsin from dilute aqueous solutions and from a mixture of trypsin and chymotrypsin or a mixture of trypsin and other enzymes.

BACKGROUND OF THE INVENTION

Isolation and purification of biologically active macromolecules such as enzymes, from natural sources is a tedious, multi-step process, which results in very low yields and thus higher costs. As a better alternative to conventional processes, researchers have developed affinity separations based techniques for selective and enhanced separations of enzymes. The basic principle used in these techniques is to form a complex between the active site of an enzyme and inhibitor, selective and high separations are possible. Most of the affinity based operations involved polymers to which inhibitors are chemically linked. The complex formed between polymeric inhibitor and the enzyme is subsequently processed to isolate the enzyme.

Various techniques such as affinity chromatography, affinity partitioning, affinity ultrafiltration, immobilized metal affinity chromatography, affinity imprinting and affinity precipitation have been developed so far. Although all these techniques use the same basic principle of forming an enzyme-inhibitor complex, they suffer from one or the other disadvantages as follows.

Affinity chromatography uses a column containing an inhibitor or a dye or an antibody for a given enzyme for its separation from a mixture of enzymes. The solution of enzymes is poured over the affinity column to retain the desired enzyme on column for subsequent isolation. This technique is efficient only for small capacity columns. With the scale up of columns, the problems of sample pretreatment and plugging of packed column becomes severe. [Y. Li, G. Kunyu, C. Lubai, Z. Hanfa, Z. Yunkui Sepu, 14, 415 (1996), T. Makriyannis, Y. D. Clonis, Biotech. Bioengg. 53, 49 (1997)].

In case of affinity crossflow ultrafiltration, a mixture of enzymes is filtered through a membrane containing affinity group under pressure. This technique is suitable in the cases where the difference between the molecular weights of the two enzymes is high. Also, with the increase in the filtration time, denaturation of enzymes as well as clogging of membrane takes place due to the pressure applied. [K. Sigmundsen, H. Filippusson, Polymer Int. 41, 335 (1996); T. B. Choe, P. Masse, A. Verdier, Biotech.Lett., 8, 163 (1986)].

Affinity partitioning of two-phase aqueous systems is widely used technique as compared to the methods mentioned above. In this technique, concentrated aqueous solution of poly (ethylene glycol) (PEG) with or without linking affinity group is mixed with enzyme solution containing moderate to high salt concentration. The two phases are mixed well and allowed to separate. The desired enzyme gets predominantly partitioned in one phase, which subsequently can be isolated. Disadvantages of this technique are non-specific extraction of other proteinaceous molecules along with desired enzyme and also poor interactions between enzyme and affinity group due to high ionic strength. [G. Takerkart, E. Segard, M. Monsigny, FEBS Lett., 42, 218 (1972); B. A. Andrews, D. M. Head, P. Dunthorne, J. A. Asenjo, Biotech. Tech., 4, 49 (1990)].

Immobilised metal affinity chromatography is a technique in which the columns of polymeric support containing chelated metal ions are used. These metal ions form coordination complex with histidine, tyrosine, cysteine, etc. present on the surface of the enzyme. Although this technique has advantages like high column capacity, ease in enzyme elution, etc. it is not very selective. [Ehteshami, J. Porath, R. Guzman, G. Ehteshami, J. Mol. Recognit. 9, 733 (1996); A. L. Blomkalns, M. R. Gomez, Prep. Biochem. Biotechnol. 27, 219 (1997)].

Molecular imprinting of matrices containing metal chelates is a recently developed technique, which increases the selectivity [F. H. Arnold, P. Dahl, D. Shnek, S. Plunkett, U.S. Pat. No. 5,310,648 (1994)]. In this technique complex of monomer containing chelated metal ion and enzyme is polymerised with crosslinker in order to imprint the polymer with enzyme. Although this technique exhibits a substantial selectivity, it is not as selective as that of biological antibodies or active site inhibitors of enzymes.

Compared to the techniques described above, affinity precipitation is an attractive technique from the point of view of application. [C. Senstad, B. Mattiasson, Biotech.Bioengg., 33, 216 (1989); M. Schneider, C. Guillot, B. Lamy, Ann. N.Y. Acad Sci. 369, 257 (1981); B. Mattiasson, R. Kaul, "Affinity precipitation", in Molecular interactions in bioseparations, T. T. Ngo ed., Plenum Press, New "York, p 469–477 (1993); J. P. Chen, J. Ferment and Bioengg., 70, 119 (1990); I. Y. Galaev, B. Mattiasson, Biotech Bioeng. 41, 1101 (1993); M. Pecs, M. Eggert, K. Schnegerl, New Polymeric Mater. 4, 19 (1993)]. It involves formation of complex between an enzyme and a stimuli sensitive polymeric inhibitor. This complex is precipitated by pH or temperature stimulus and isolated. It is then dissociated, polymer separated by pH or temperature stimulus and the enzyme isolated. Thus, the recovery of the enzyme by this technique is much simpler and the scale up of the process is also easy. Hitherto, affinity precipitation suffers from restrictions on the accessibility of the enzyme towards the polymer bound inhibitor.

The strength of the complex formed between inhibitor and the enzyme decreases 20 to 300 fold when it is bound to the polymer. [K. B. Male, J. H. T. Luong, A. L. Nbuyen, Enzy. Microb. Tech., 9, 374 (1987); Yu, I. Galled, B. Matisson, Biotech. Bioengg. 41, 1101 (1993); J. H. T. Loung, K. B. Male, A. L. Nguyen, Biotech Bioengg., 31, 439 (1988); M. Pecs, M. Eggert, K. Schuegerl, J. Biotech., 21, 137 (1991)]. This weakening of the complex is attributed mainly to the restrictions on the free access of enzyme to the polymer bound inhibitor. The strength of the complex is expressed in terms of inhibition constant ($K_i$). The lower the value of $K_I$ the higher is the inhibition and stronger is the complex formed. Higher $K_i$ values of polymeric inhibitors result in poor recovery of enzymes. Also, increased concentration of inhibitors on the high molecular weight polymers results in high $K_I$ values.

Introduction of spacers between the polymer backbone and the inhibitor is a well-known methodology used in affinity chromatography to enhance the interaction between inhibitor and the enzyme. But in affinity precipitation, the use of spacer containing polymers has not been reported so far, because the complex formation between polymer bound inhibitor and the enzyme takes place in homogeneous solution and it has been suggested that in homogeneous solutions spacers are not required.

OBJECTS OF THE INVENTION

It is therefore an object of the invention to provide a process for the preparation of thermoprecipitating affinity polymers comprising spacers between the polymer backbone and the inhibitor, useful in enhanced recovery process of trypsin by affinity precipitation.

It is another object of the invention to provide a process for the preparation of thermoprecipitating affinity polymers that exhibit enhanced interactions with the enzymes and thereby give high recovery for the desired enzymes.

SUMMARY OF THE INVENTION

Accordingly the present invention provides a process for the preparation of thermoprecipitating affinity polymers useful in the enhanced recovery of enzymes which comprises polymerising a monomer comprising a spacer and a co-monomer with a polymerisation initiator and a polymerisation accelerator at ambient temperature and pressure for a period ranging between 2 to 24 hours to obtain a polymer, linking an inhibitor to pendant carboxyl groups of the spacers in the polymer to obtain an affinity polymer by any conventional method.

In one embodiment of the invention the spacer monomer may be selected from compounds of the formula $CH_2=CR-CO-NH-(CH_2)_n-COOH$ wherein R is hydrogen or methyl group and n is an integer between 1 to 10.

In another embodiment of the invention, the comonomer may be selected from compounds like N-isopropyl acrylamide, N-butyl acrylamide, N-isopropyl methacrylamide, N-vinyl caprolactam.

In a further embodiment of the invention, the molar ratio of spacer monomer to co-monomer may in the range of 1:10 to 1:1.

In another embodiment of the invention, the polymerisation initiator used may selected from compound such ammonium persulfate, potassium persulfate.

In yet another embodiment of the invention, the polymerisation initiator may be 10% to 20% by wt. of the monomers.

In yet another embodiment of the invention, the polymerisation accelerator may be selected from compounds like N,N,N',N"tetramethylene ethylene diamine, sodium meta bisulfate, potassium meta bisulfate.

In another embodiment of the invention, the polymerisation accelerator is 1% to 5% by wt of the monomers.

In a further embodiment of the invention, the inhibitor may be selected from compounds like meta amino benzamidine, para amino benzamidine and their hydrochlorides.

In yet another embodiment of the invention, the molar ratio of inhibitor to carboxyl groups in the polymer is in the range of 1:1 to 10:1.

In another embodiment of the invention, the condensing reagent used for linking the inhibitor to the pendant carboxyl groups of the polymer is selected from 1-cyclohexyl 3-(2-morpholinoethyl)carbodiimide metho-p-toluenesulphate (CMC), 1-ethyl-3-(3-Dimethylamino-propyl)carbodiimide (EDC).

In a further embodiment of the invention, the molar ratio of the condensing agent to carboxyl groups may be in the range of 1:1 to 100:1.

DETAILED DESCRIPTION OF THE INVENTION

The thermoprecipitating affinity polymers comprising spacers is typically prepared under mild conditions by dissolving the spacer monomer, co-monomer and polymerisation initiator in water and purging the solution with nitrogen for 10 to 20 minutes. The polymerisation accelerator is added and the solution is kept at 37° C. for 24 hours for polymerisation. After polymerisation, temperature of the solution is raised above lower critical solution temperature (LCST) of the polymer and precipitated polymer is isolated.

In another feature of the invention, the polymer is dissolved in water at 10° C. One to ten fold molar excess of inhibitor and condensing reagent over the carboxyl groups in the polymer is added to this solution. The solution is stirred for 1 to 12 hours at 10° C. Inhibitor-linked polymer, i.e. affinity polymer is then precipitated by raising the temperature above its LCST (37 to 65° C.) and precipitated affinity polymer is isolated.

The affinity polymers synthesised by the process of the present invention are used in trypsin recovery. A solution of the affinity polymer is mixed with a solution of trypsin and chymotrypsin and allowed to stand at 4 to 25° C. for 15 minutes to 1 hour. The temperature of the solution is then raised above the LCST of the affinity polymer (37 to 65° C.) to precipitate the polymer-trypsin complex. This complex is separated by centrifugation and the polymer-trypsin complex is dissociated by dissolving it in an acidic buffer. The temperature of the solution is then raised above LCST of the affinity polymer. The polymer is separated by centrifugation and the clear filtrate exhibiting trypsin activity is isolated.

Although the present invention describes a process for the preparation of thermoprecipitating affinity polymers useful in the enhanced recovery of trypsin from a mixture of trypsin and chymotrypsin, the scope of the present invention is not and should not be construed to limit to only such affinity polymers for the separation of trypsin. It may extend to such combinations of polymer bound inhibitors and their respective enzymes.

The ranges and limitations provided in the present specification, examples and claims are those believed to particularly point out and distinctly cover the present invention. However, other ranges and limitations which perform substantially the same function in the same or substantially the same manner to obtain the same or substantially the same results are intended to be within the scope of the instant invention.

EXAMPLE 1

This example relates to the preparation of poly (N-isopropyl acrylamide-co-N-acryloyl glycyl-para aminobenzamidine) (affinity polymer containing spacer of 1 methylene group)

1.29 g (0.01 M) N-acryloyl glycine (spacer monomer), 10.17 g (0.09 M) N-isopropyl acrylamide (co-monomer) was dissolved in 50 ml water. To this 1.15 g (10% w/w) ammonium persulfate was added and the solution was purged with nitrogen for 15 minutes. Then polymerisation was initiated by adding 0.5 ml of N,N,N′,N″tetramethylethylene diamine (TEMED) to it. Polymerisation was allowed to proceed at 37° C. for 18 hours. The polymer so synthesised was precipitated by increasing the temperature of the aqueous solution above its lower critical solution temperature (LCST). It was washed with cold double distilled water twice and once with cold Tris-HCl buffer. Then the polymer was dried under vacuum at room temperature. The amount of carboxyl groups incorporated in the polymer was estimated from its acid value. Data are listed in Table I. Paramino benzamidine was covalently linked to pendant carboxyl groups of the polymer via amide bond using 1-cyclohexyl 3-(2-morpholinoethyl) carbodiimide metho p-toluenesulfonate (CMC). Para aminobenzamidine dihydrochloride was treated with 40 fold molar excess of sodium acetate in water to free the para-amino groups. Then 4 g of the polymer was dissolved in 40 ml of double distilled water at 10° C. Ten fold molar excess of CMC and para aminobenzamidine solution over the carboxyl groups was added and the reaction mixture was stirred for 12 hours at 10° C. Para aminobenzamidine linked polymer was precipitated out by increasing the temperature of the solution above its LCST. It was washed three times with cold double distilled water and once with Tris-HCl buffer. The polymer was dried in vacuo at room temperature. Para aminobenzamidine loading in the polymers was estimated spectrophotometrically. The loading data is summarized in Table I.

EXAMPLE 2

This example relates to the preparation of poly (N-isopropyl acrylamide-co-N-acryloyl β alanyl-para aminobenzamidine) (affinity polymer containing spacer of 2methylene group)

1.43 g (0.01 M) N-acryloyl β alanine (spacer monomer), 10.17 g (0.09 M) N-isopropyl acrylamide (co-monomer) was dissolved in 50 ml water. To this 1.16 g (10% w/w) ammonium persulfate was added and the solution was purged with nitrogen for 15 minutes. Then polymerisation was initiated by adding 0.5 ml of TEMED to it. Polymerisation was allowed to proceed at 37° C. for 18 hours. The polymer so synthesised was precipitated by increasing the temperature of the aqueous solution above its lower critical solution temperature (LCST). It was washed with cold double distilled water twice and once with cold Tris-HCl buffer. Then the polymer was dried under vacuum at room temperature. The amount of carboxyl groups incorporated in the polymer was estimated from its acid value. Data are listed in Table I. Paramino benzamidine was covalently linked to pendant carboxyl groups of the polymer via amide bond using 1-cyclohexyl 3-(2-morpholinoethyl) carbodiimide metho p-toluenesulfonate (CMC). Para aminobenzamidine dihydrochloride was treated with 40 fold molar excess of sodium acetate in water to free the para-amino groups. Then 4 g of the polymer was dissolved in 40 ml of double distilled water at 10° C. Ten fold molar excess of CMC and para aminobenzamidine solution over the carboxyl groups was added and the reaction mixture was stirred for 12 hours at 10° C. Para aminobenzamidine linked polymer was precipitated out by increasing the temperature of the solution above its LCST. It was washed three times with cold double distilled water and once with Tris-HCl buffer. The polymer was dried in vacuo at room temperature. Para aminobenzamidine loading in the polymers was estimated spectrophotometrically. The loading data is summarized in Table I.

EXAMPLE 3

This example relates to the preparation of poly (N-isopropyl acrylamide-co-N-acryloyl 4 amino butyryl-para aminobenzamidine) (affinity polymer containing spacer of 3 methylene group)

1.57 g (0.01 M) N-acryloyl 4 amino butyric acid (spacer monomer), 10.17 g (0.09 M) N-isopropyl acrylamide (co-monomer) was dissolved in 50 ml water. To this 1.17 g (10% w/w) ammonium persulfate was added and the solution was purged with nitrogen for 15 minutes. Then polymerisation was initiated by adding 0.5 ml of TEMED to it Polymerisation was allowed to proceed at 37° C. for 18 hours. The polymer so synthesised was precipitated by increasing the temperature of the aqueous solution above its lower critical solution temperature (LCST). It was washed with cold double distilled water twice and once with cold Tris-HCl buffer. Then the polymer was dried under vacuum at room temperature. The amount of carboxyl groups incorporated in the polymer was estimated from its acid value. Data are listed in Table I. Paramino benzamidine was covalently linked to pendant carboxyl groups of the polymer via amide bond using 1-cyclohexyl 3-(2-morpholinoethyl) carbodiimide metho p-toluenesulfonate (CMC). Para aminobenzamidine dihydrochloride was treated with 40 fold molar excess of sodium acetate in water to free the para-amino groups. Then 4 g of the polymer was dissolved in 40 ml of double distilled water at 10° C. Ten fold molar excess of CMC and para aminobenzamidine solution over the carboxyl groups was added and the reaction mixture was stirred for 12 hours at 10° C. Para aminobenzamidine linked polymer was precipitated out by increasing the temperature of the solution above its LCST. It was washed three times with cold double distilled water and once with Tris-HCl buffer. The polymer was dried in vacuo at room temperature. Para aminobenzamidine loading in the polymers was estimated spectrophotometrically. The loading data is summarized in Table I.

EXAMPLE 4

This example relates to the preparation of poly(N-isopropyl acrylamide-co-N-acryloyl 6 amino caproyl-para aminobenzamidine) (affinity polymer containing spacer of 5 methylene group)

1.85 g (0.01 M) N-acryloyl 6 aminocaproic acid (spacer monomer), 10.17 g (0.09 M) N-isopropyl acrylamide (co-monomer) was dissolved in 50 ml water. To this 1.20 g (10% w/w) ammonium persulfate was added and the solution was purged with nitrogen for 15 minutes. Then polymerisation was initiated by adding 0.5 ml of TEMED to it. Polymerisation was allowed to proceed at 37° C. for 18 hours. The polymer so synthesised was precipitated by increasing the temperature of the aqueous solution above its lower critical solution temperature (LCST). It was washed with cold double distilled water twice and once with cold Tris-HCl buffer. Then the polymer was dried under vacuum at room temperature. The amount of carboxyl groups incorporated in the polymer was estimated from its acid value. Data are listed in Table I. Paramino benzamidine was covalently linked to pendant carboxyl groups of the polymer via amide bond using 1-cyclohexyl 3-(2-morpholinoethyl) carbodiimide metho p-toluenesulfonate (CMC). Para aminobenzamidine dihydrochloride was treated with 40 fold molar excess of sodium acetate in water to free the para-amino groups. Then 4 g of the polymer was dissolved in 40 ml of double distilled water at 10° C. Ten fold molar excess of CMC and para aminobenzamidine solution over the carboxyl groups was added and the reaction mixture was stirred for 12 hours at 10° C. Para aminobenzamidine linked polymer was precipitated out by increasing the temperature of the solution above its LCST. It was washed three times with cold double distilled water and once with Tris-HCl buffer. The polymer was dried in vacuo at room temperature. Para aminobenzamidine loading in the polymers was estimated spectrophotometrically. The loading data is summarized in Table I.

EXAMPLE 5

This example relates to the preparation of poly (N-isopropyl methacrylamide-co-N-acryloyl para aminobenzamidine)

1.89 g (0.01 M) N-acryloyl para amino benzamidine (spacer monomer), 11.43 g (0.09 M) N-isopropyl methacrylamide (co-monomer) was dissolved in 50 ml water. To this 1.33 g (10% w/w) ammonium persulfate was added and the solution was purged with nitrogen for 15 minutes. Then polymerisation was initiated by adding 0.5 ml of TEMED to it. Polymerisation was allowed to proceed at 37° C. for 18 hours. The polymer so synthesised was precipitated by increasing the temperature of the aqueous solution above its lower critical solution temperature (LCST). It was washed with cold double distilled water twice and once with cold Tris-HCl buffer. Then the polymer was dried under vacuum at room temperature. The amount of carboxyl groups incorporated in the polymer was estimated from its acid value. Data are listed in Table I. Paramino benzamidine was covalently linked to pendant carboxyl groups of the polymer via amide bond using 1-cyclohexyl 3-(2-morpholinoethyl) carbodiimide metho p-toluenesulfonate (CMC). Para aminobenzamidine dihydrochloride was treated with 40 fold molar excess of sodium acetate in water to free the para-amino groups. Then 4 g of the polymer was dissolved in 40 ml of double distilled water at 10° C. Ten fold molar excess of CMC and paraaminobenzamidine solution over the carboxyl groups was added and the reaction mixture was stirred for 12 hours at 10° C. Para aminobenzamidine linked polymer was precipitated out by increasing the temperature of the solution above its LCST (lower critical solution temperature). It was washed three times with cold double distilled water and once with Tris-HCl buffer. The polymer was dried in vacuo at room temperature. Para aminobenzamidine loading in the polymers was estimated spectrophotometrically. The loading data is summarized in Table I.

EXAMPLE 6

This example relates to the preparation of poly (N-butyl acrylamide-co-N-acryloyl 4 amino butyryl-para aminobenzamidine) (affinity polymer containing spacer of 3 methylene group)

1.57 g (0.01 M) N-acryloyl 4 amino butyric acid (spacer monomer), 11.44 g (0.09 M) N-butylacrylamide (co-monomer) was dissolved in 50 ml water. To this 1.30 g (10% w/w) ammonium persulfate was added and the solution was purged with nitrogen for 15 minutes. Then polymerisation was initiated by adding 0.5 ml of TEMED to it. Polymerisation was allowed to proceed at 37° C. for 18 hours. The polymer so synthesised was precipitated by increasing the temperature of the aqueous solution above its lower critical solution temperature (LCST). It was washed with cold double distilled water twice and once with cold Tris-HCl buffer. Then the polymer was dried under vacuum at room temperature. The amount of carboxyl groups incorporated in the polymer was estimated from its acid value. Data are listed in Table I. Paramino benzamidine was covalently linked to pendant carboxyl groups of the polymer via amide bond using 1-cyclohexyl 3-(2-morpholinoethyl) carbodiimide metho p-toluenesulfonate (CMC). Para aminobenzamidine dihydrochloride was treated with 40 fold molar excess of sodium acetate in water to free the para-amino groups. Then 4 g of the polymer was dissolved in 40 ml of double distilled water at 10° C. Ten fold molar excess of CMC and paraaminobenzamidine solution over the carboxyl groups was added and the reaction mixture was stirred for 12 hours at 10° C. Para aminobenzamidine linked polymer was precipitated out by increasing the temperature of the solution above its LCST. It was washed three times with cold double distilled water and once with Tris-HCl buffer. The polymer was dried in vacuo at room temperature. Para aminobenzamidine loading in the polymers was estimated spectrophotometrically. The loading data is summarized in Table I.

EXAMPLES 7–12

These examples illustrate the preparations of polymers poly (N-isopropylacrylamide-co-N-acryloyl 6 aminocaproyl-para aminobenzamidine)[poly (NIPAM-co-Ac.6ACAPABA)]

Copolymers of N-isopropyl acrylamide (NIPAM) with increasing concentrations of N-acryloyl 6 amino caproic acid (Ac.6ACA) in the feed were synthesised and para aminobenzamidine was linked to pendant carboxyl groups of these polymers as per the procedure described in Example 1. Data for the feed composition of monomers and the amount of para aminobenzamidine incorporated in the affinity polymers are given in Table 2.

EXAMPLE 13

Estimation of inhibition constant ($K_i$) of affinity polymers

The inhibition constant $K_i$ was determined from Dixon plot. 10% polymer solution was diluted serially by adding double distilled water to get 9%, 8%, 7%, and 6% solutions. The substrate N-benzoyl arginine para nitroanilide was dissolved in distilled dimethyl formamide to get the following different concentrations 0.6 mM. 0.048 mM, 0.36 mM. 0.24 mM and 0.12 mM. Trypsin solution (1 $\mu$M=24 $\mu$g/ml) was prepared in 0.05 M Tris-HCl buffer, pH 8.1, containing 10 mM $Ca^{+2}$.

One ml of polymer solution was mixed with 1 ml of trypsin solution. After vortexing the mixture, it was allowed to incubate at 25° C. for 15 minutes. Then this was added to 1 ml substrate solution taken in a 3 ml capacity cuvette. The rate of substrate hydrolysis (V) was monitored by following the absorbance at 410 nm on UV spectrophotometer for 1 minute. Dixon plot of 1/V vs [I] at various substrate and inhibitor concentrations was plotted and $K_i$ was graphically obtained. The intersect on x-axis gives $-K_i$ value. Data for $K_i$ values of all polymers are listed in Tables 1 and 2.

EXAMPLE 14

This example illustrates the use of the product for the recovery of trypsin from a mixture of trypsin and chymotrypsin.

One ml of 10% (w/v) polymer solution was mixed with 1 ml of trypsin-chymotrypsin synthetic mixture (trypsin=24 $\mu$g/ml and chymotrypsin=58 $\mu$g/ml which corresponds to the identical initial activities of these two). It was incubated at 25° C. for 15 minutes. The temperature of the solution was then raised above its LCST. The polymer-enzyme complex was separated by centrifugation at 10,000 rpm for 20 minutes. The supernatant was stored at 4° C. Trypsin was dissociated from complex by the treatment of glycine-HCl buffer pH 2.8. Again the temperature of the solution was raised above the LCST and the supernatant separated after centrifugation at 10,000 rpm for 15 minutes. The activities of trypsin and chymotrypsin was estimated using standard substrates such as N-benzoyl DL arginyl para nitro anilide (DL-BAPNA) for trypsin and N-benzoyl L-tryosyl para nitro anilide (BTPNA) for chymotrypsin respectively. The percent recoveries of the activities of the enzymes are summarized in Table 3.

Data listed in Table 3 shows the percent recoveries of the activities of the enzymes trypsin from chymotrypsin increased from 38% to 68%.

Advantages of the invention

1. The process of the present invention enables synthesis of thermoprecipitating affinity polymers exhibiting enhanced interactions with the enzyme and thereby giving high recovery of the desired enzyme.

TABLE 1

Polymers which demonstrate spacer effect

| No. | Affinity polymer | Molar feed composition of NIPAM: Ac. Spacer | Moles of carboxyl gr./g polymer | Moles of PABA/g polymer | LCST of PABA conjugated polymer (° C.) | MW ($M_a$) | $K_i$ moles |
|---|---|---|---|---|---|---|---|
| 1 | Example 1 | 0.09:0.01 | $9.64 * 10^{-4}$ | $2.25 * 10^{-4}$ | 34 | 797 | $250 \pm 10 * 10^{-6}$ |
| 2 | Example 2 | 0.09:0.01 | $4.10 * 10^{-4}$ | $1.50 * 10^{-4}$ | 33 | 900 | $225 \pm 12 * 10^{-6}$ |
| 3 | Example 3 | 0.09:0.01 | $9.00 * 10^{-4}$ | $2.50 * 10^{-4}$ | 48 | 960 | $110 \pm 6 * 10^{-6}$ |
| 4 | Example 4 | 0.09:0.01 | $9.82 * 10^{-4}$ | $2.60 * 10^{-4}$ | 38 | 980 | $25 \pm 3 * 10^{-6}$ |

TABLE 2

Polymers synthesised to demonstrate crowding effect

| No. | Affinity polymer | Molar feed composition of NIPAM: Ac. 6ACA | Moles of carboxyl gr./g polymer | Moles of PABA/g polymer | MW ($M_a$) | $K_i$ moles |
|---|---|---|---|---|---|---|
| 1 | Example 7 (poly (N-isopropyl-co-Ac.6ACA.PABA) | 30:1 | $4 * 10^{-5}$ | $3.7 * 10^{-5}$ | 3237 | $38 \pm 5 * 10^{-6}$ |
| 2 | Example 8 (poly (N-isopropyl-co-Ac.6ACA.PABA) | 20:1 | $6.10 * 10^{-5}$ | $3.7 * 10^{-5}$ | 3200 | $38 \pm 5 * 10^{-6}$ |
| 3 | Example 9 (poly (N-isopropyl-co-Ac.6ACA.PABA) | 9:1 | $9.82 * 10^{-4}$ | $2.60 * 10^{-4}$ | 980 | $25 \pm 2 * 10^{-6}$ |
| 4 | Example 10 (poly (N-isopropyl-co-Ac.6ACA.PABA) | 5:1 | $1.49 * 10^{-3}$ | $3.9 * 10^{-4}$ | 4199 | $19 \pm 2 * 10^{-6}$ |
| 5 | Example 11 (poly (N-isopropyl-co-Ac.6ACA.PABA) | 2:1 | $2.19 * 10^{-3}$ | $3.9 * 10^{-4}$ | 3900 | $19 \pm 2 * 10^{-6}$ |
| 6 | Example 12 (poly (N-isopropyl-co-Ac.6ACA.PABA) | 1:1 | $2.12 * 10^{-3}$ | $4.2 * 10^{-4}$ | 3100 | $9 \pm 1 * 10^{-6}$ |

TABLE 3

Separation of Trypsin from Trypsin and Chymotrypsin mixture

| No. | Polymer | % activity recovery of trypsin | % activity recovery of chymotrypsin |
|---|---|---|---|
| 1 | Example 1 | 38.8 ± 3.4 | 4.0 ± 0.8 |
| 2 | Example 2 | 49.7 ± 4.7 | 5.6 ± 1.4 |
| 3 | Example 3 | 54.0 ± 8.6 | 7.32 ± 2.8 |
| 4 | Example 4 | 6.84 ± 9.4 | 9.24 ± 4.0 |

Data in Table 1 shows that with the increase in the spacer chain length from 1 to 5 methylene groups $K_i$ of the affinity polymers decreased from $250*10^{-6}$ M to $25*10^{-6}$M, i.e. the strength of the trypsin-polymer complex increased 10 fold (Examples 1–4)

Data in Table 2 shows that in the case of low molecular weight affinity polymers, decrease in the $K_i$ values is observed with merely increasing concentration of para amino benzamidine (Examples 7–12).

2. Affinity polymers exhibiting a wide range of lower critical solution temperature are synthesised using the process of the present invention. Thus affinity polymers with low LCST could be used for separations at very low temperatures. This is an added advantage for recovery of heat sensitive enzymes.

We claim:

1. A process for the isolation of an enzyme which comprises: mixing an affinity polymer with a solution containing the enzyme at an ambient temperature and pressure for a period of from 15 and 60 minutes to form an affinity polymer-enzyme complex; thermoprecipitating the resulting affinity polymer-enzyme complex; and separating the enzyme from the resulting affinity polymer-enzyme complex, said affinity polymer comprising a spacer monomer with pendant carboxyl groups and a co-monomer.

2. The process of claim 1, wherein the enzyme is trypsin.